(12) United States Patent
Bhatia et al.

(10) Patent No.: US 7,574,059 B2
(45) Date of Patent: Aug. 11, 2009

(54) SYSTEM, METHOD, AND APPARATUS FOR PROVIDING MASSIVELY SCALED DOWN VIDEO USING ICONIFICATION

(75) Inventors: Sandeep Bhatia, Adarsh Palm Meadows (IN); Srinivasa Mogathala Prabhakara Reddy, Adarsh Palm Meadows (IN); Sivugururaman Mahadevan, Bangalore (IN)

(73) Assignee: Broadcom Corporation, Irvine, CA (US)

( * ) Notice: Subject to any disclaimer, the term of this patent is extended or adjusted under 35 U.S.C. 154(b) by 707 days.

(21) Appl. No.: 10/977,864

(22) Filed: Oct. 29, 2004

(65) Prior Publication Data

US 2006/0093225 A1 May 4, 2006

(51) Int. Cl.
*G06K 9/36* (2006.01)
*G06K 9/46* (2006.01)

(52) U.S. Cl. .................................... 382/233

(58) Field of Classification Search ............... 382/232, 382/233, 282, 284, 300, 305; 348/14.09, 348/14.11, E7.083, E7.084; 375/240.15, 375/240.16, E7.088, E7.211, E7.269
See application file for complete search history.

(56) References Cited

U.S. PATENT DOCUMENTS

| | | | | |
|---|---|---|---|---|
| 5,377,014 A * | 12/1994 | Knauer et al. | ................. | 386/47 |
| 5,446,491 A * | 8/1995 | Shibata et al. | ........... | 348/14.09 |
| 5,524,071 A * | 6/1996 | Yokomizo | ................... | 382/284 |
| 5,761,341 A * | 6/1998 | Go | ............................ | 382/232 |
| 5,923,665 A * | 7/1999 | Sun et al. | .................... | 370/477 |
| 5,973,740 A * | 10/1999 | Hrusecky | .............. | 375/240.15 |
| 5,986,708 A * | 11/1999 | Katata et al. | ............. | 375/240.1 |
| 6,240,210 B1 * | 5/2001 | Koyama | .................... | 382/233 |
| 7,133,452 B1 * | 11/2006 | Rault | .................... | 375/240.16 |
| 7,333,545 B2 * | 2/2008 | Duruoz et al. | ......... | 375/240.25 |
| 2006/0062388 A1 * | 3/2006 | Aggarwal | ................... | 380/239 |
| 2006/0093225 A1 * | 5/2006 | Bhatia et al. | ............... | 382/233 |
| 2007/0019743 A1 * | 1/2007 | Dambrackas et al. | .. | 375/240.26 |

* cited by examiner

*Primary Examiner*—Amir Alavi
(74) *Attorney, Agent, or Firm*—McAndrews, Held & Malloy, Ltd.

(57) ABSTRACT

Presented herein are systems, methods, and apparatus for simultaneously providing full size video and massively scaled down video using inconification. In one embodiment, there is presented a method for providing a video output. The method comprises decoding an encoded picture, thereby resulting in a decoded picture; reducing the decoded picture, thereby resulting in a reduced picture; storing the reduced picture; and encoding the reduced picture, thereby resulting in a synthetic picture.

20 Claims, 3 Drawing Sheets

SYSTEM, METHOD, AND APPARATUS FOR PROVIDING MASSIVELY SCALED DOWN VIDEO USING ICONIFICATION

RELATED APPLICATIONS

[Not Applicable]

FEDERALLY SPONSORED RESEARCH OR DEVELOPMENT

[Not Applicable]

MICROFICHE/COPYRIGHT REFERENCE

[Not Applicable]

BACKGROUND OF THE INVENTION

An iconized frame, also known as a thumb nail scale, is a video frame that is massively scaled down. Iconized frames are useful for previewing video data. Several iconized frames can be viewed simultaneously allowing a user to quickly ascertain the contents of a video.

Due to the usefulness of iconized frames, many standards bodies have adopted a requirement to provide iconized frames of arbitrary scaled down factors for video decoders. Conventionally, the foregoing scale down occurs in the scalar of the display engine. However, the scalar in the display engine is primarily designed for lower scale down factors that are usually not more than ½.

Further limitations and disadvantages of conventional and traditional approaches will become apparent to one of skill in the art, through comparison of such systems with the present invention as set forth in the remainder of the present application with reference to the drawings.

BRIEF SUMMARY OF THE INVENTION

Presented herein are systems, methods, and apparatus for simultaneously providing full size video and massively scaled down video using inconification.

In one embodiment, there is presented a method for providing a video output. The method comprises decoding an encoded picture, thereby resulting in a decoded picture; reducing the decoded picture, thereby resulting in a reduced picture; storing the reduced picture; and encoding the reduced picture, thereby resulting in a synthetic picture.

In another embodiment, there is presented a decoder system for providing a video output. The decoder system comprises a video decoder, a memory, and a synthetic picture generator. The video decoder decodes an encoded picture, thereby resulting in a decoded picture and reducing the decoded picture, thereby resulting in a reduced picture. The memory stores the reduced picture. The synthetic picture generator encodes the reduced picture, thereby resulting in a synthetic picture.

These and other advantages and novel features of the present invention, as well as details illustrated embodiments thereof, will be more fully understood from the following description and drawings.

DETAILED DESCRIPTION OF THE INVENTION

Figure 1:
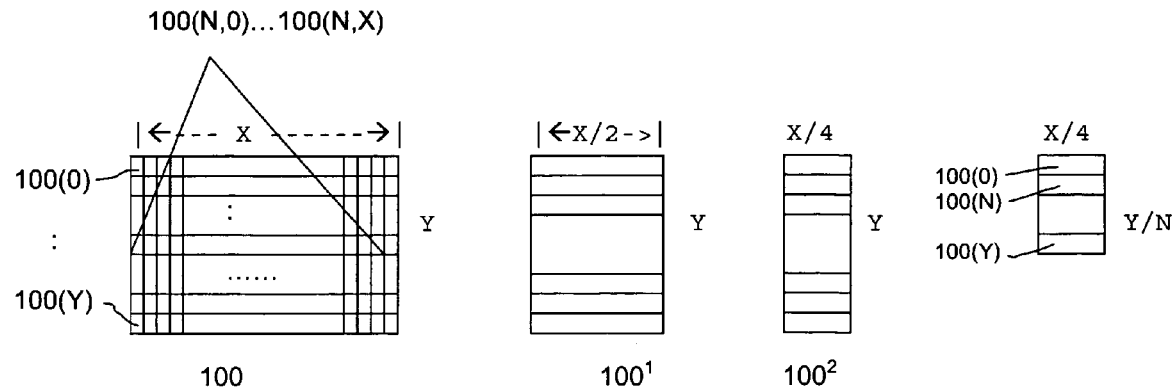
FIG. 1 is a block diagram of an exemplary frame, massively scaled down in accordance with an embodiment of the present invention.

Referring now to FIG. 1, there is illustrated a block diagram of an exemplary frame 100, massively scaled down in accordance with an embodiment of the present invention. A video comprises a series of frames representing still images associated with a particular time interval.

A frame 100 can comprise any number of rows 100(0) ... 100(Y) of pixels 100(N, 0) ... 100(N, X). The frame 100 can be reduced in the horizontal direction by selecting horizontally adjacent pixels 100(N, 2*I) and 100(N, 2*I+1), where I is an integer, and averaging the values of the horizontally adjacent pixels. A reduced frame 100' of Y×X/2 pixels can be generated from the average values of the horizontally adjacent pixels.

The frame 100 can be iteratively reduced by repeating the foregoing with the reduced frame $100^1$, resulting in a further reduced frame $100^2$, of Y×X/4 pixels. This process can be continued any number, m, times, resulting in a reduced frame $100^m$, of Y×X/$2^m$.

The reduced frame $100^m$ can be reduced by a factor n by discarding in the vertical direction by selecting each nth row $100^m$(n*I), and generating a data structure $100^{mn}$ comprising the nth rows $100^m$(n*I). Accordingly, the resulting structure $100^{mn}$ represents the frame 100, scaled down by a factor of $2^m$n.

Figure 2:
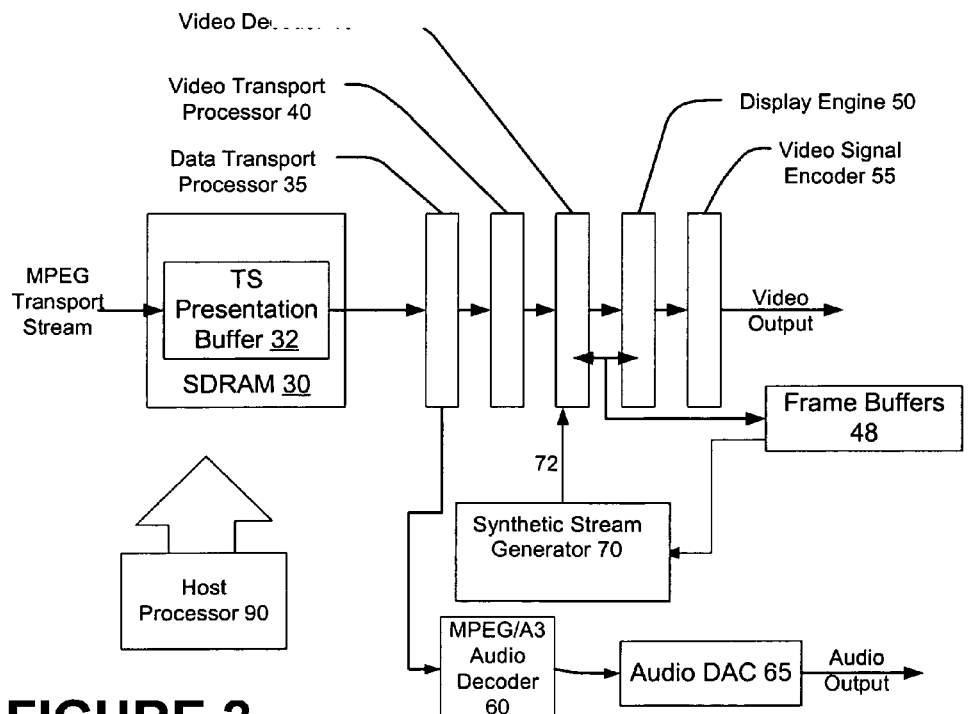
FIG. 2 is a block diagram of an exemplary video decoder in accordance with an embodiment of the present invention.

Referring now to FIG. 2, there is illustrated a block diagram of an exemplary decoder in accordance with an embodiment of the present invention. Data is output from buffer 32 within SDRAM 30. The data output from the buffer 32 is then passed to a data transport processor 35. The data transport processor 35 demultiplexes the transport stream into packetized elementary stream constituents, and passes the audio transport stream to an audio decoder 60 and the video transport stream to a video transport decoder 40. The video transport decoder 40 provides a video elementary stream to a video decoder 45. The video decoder 45 in regular mode decompresses the video elementary stream and reconstructs the video frames. The video frames are stored in frame buffers 48. The display engine 50 scales the video picture, renders the graphics, and constructs the complete display.

A host processor 90 manages the foregoing operation of the decoder system. The decoder system can operate in either a regular mode or a scaling mode, wherein the particular mode can be controlled by user inputs provide to the host processor 90 via a user interface.

When the decoder system operates in the regular mode, the host processor 90 passes buffer identifiers, prediction buffers chosen by a buffer manager, and other data to the video decoder 45 in a pre-defined data structure after the picture or frame level parsing is completed, one time per frame or field. When the video decoder 45 first encounters a slice start code, the video decoder 45 is fed with the slice data and below until the next non-slice occurs. When the next non-slice occurs, the host processor 90 sends a picture end code to the video decoder 45 and awaits a marker interrupt from the video decoder 45, indicating that the video decoder 45 is done with decoding of the frame or field. The video decoder 45 is responsible for filling the frame buffer 48 that is assigned for decode with the decoded frame 100.

When the host 90 turns on the scaling mode, the MPEG video decoder 45 is configured to switch to a reduced memory mode (RMM). The host processor 90 passes on the buffer identifiers and prediction buffer identifiers provided by the buffer manager after enabling an RMM flag that is an element in the predefined data structure between the host 90 and the video decoder 45.

As the video decoder 45 encounters pictures, the video decoder 45 generates a reduced frame $100^1$ that is horizontally half in size during the first pass. The reduced frame $100^1$ is written to a particular one of a set of frame buffers 48.

As can be seen, the video decoder 45 may post process every decoded frame after decoding during the first pass. A challenge occurs when the video frames 100 comprise MPEG B-frames. MPEG B-frames are decoded and displayed almost simultaneously, to reduce the frame buffer 48 requirements to three frame buffers. However, four frame buffers 48 can be used and the video decoder 45 can be configured to operate with four frame buffers 48.

Repeated iterations from the frame buffers 48 can be used to provide reduced frames $100^m$ with a variety of scale factors. During a second pass, the frame 100 can be reduced by a factor of ¼ in the horizontal direction, resulting in reduced frame $100^2$. Where repeated predictions are used to provide a reduced frame $100^m$ with a desired scale factor, a synthetic picture generator 70 generates a compressed picture describing the reduced frame 100.

The synthetic picture 72 represents the reduced frame $100^1$, encoded according the predetermined standard of the original video data provided to the video decoder 45. For example, wherein the video data provided to the video decoder 45 is encoded in accordance with the MPEG standard, the synthetic stream represents the reduced frame $100^1$ encoded in accordance with the MPEG standard. Additionally, the synthetic picture 72 is predicted from reduced frame 1001. Accordingly, the synthetic picture 72 has motion vectors and prediction error equal to zero.

The video decoder 45 decodes the synthetic picture 72 in the next pass, and divides and averages neighboring pixels to generate a reduced frame 100 that is horizontally reduced in size from reduced frame $100^1$. The desired scale factor can be provided to the host processor 90 via user inputs. The host 90 can have an application program interface call to the video decoder 45 where the host processor 90 specifies the number of passes that are required.

Scaling by ½ (Pass 0)

(1) The host processor 90 passes on the frame buffer identifiers for decoding, and the prediction buffer identifiers from a buffer manager, after enabling a reduced memory mode flag, in a pre-defined data structure.

(2) The video decoder 45 is fed with the compressed data from the slice layer and below, and starts decoding, making predictions as applicable. The video decoder 45 halves the horizontal size of the frame 100, resulting in a reduced frame $100^1$ and writes to a from buffer 48.

Scaling by ¼ (Pass 1)

(1) The host processor 90, after getting a buffer identifier and prediction buffer identifiers from a buffer manager enables an RMM flag, and passes on a predefined data structure to the video decoder 45.

(2) The video decoder 45 receives the compressed data from the slice layer and below till a non-slice code appears in a start code table.

(3) The video decoder 45 decodes the frame 100 to the frame buffer 48, composes a pixel from two horizontal pixels and writes the reduced frame $100^1$ to a frame buffer 48. The video decoder 45 then sends a marker interrupt to the host processor 90.

(4) Upon reception of the marker interrupts, the host processor 90 prepares a data structure for a synthetic stream comprising the reduced frame $100^1$ depending on the structure of the actual stream being decoded and also the buffer bases for decoding it. The host processor 90 enables a half-icon flag after disabling an RMM flag. The portion of the 48 frame buffer 48 storing the reduced frame $100^1$ and another portion of the 48 frame buffer 48 are selected.

(5) The host processor 90 then issues a direct memory access command to initiate generation of a synthetic stream by the video encoder 70 and transfer of the synthetic stream to the video decoder 45. The video decoder 45 decodes the synthetic stream, resulting in a decoded synthetic stream. The decoded synthetic stream overwrites the reduced frame $100^1$. The video decoder 45 also generates a reduced decoded synthetic stream comprising reduced frame $100^2$. The decoded synthetic stream is written to the another portion of the 48 frame buffer 48. The foregoing decoded synthetic stream comprising reduced frame $100^2$ effectively achieves ¼ horizontal scale down.

(6) The video decoder 45 sends a marker interrupt to the host processor 90, after writing reduced frame $100^2$.

Scaling by ⅛ (PASS 2)

(1) After the marker interrupt for pass 1, the host processor 90 prepares the data structure for a second synthetic stream comprising a frame/field (where the horizontal size is $¼^{th}$ the size of the full size frame 100). Accordingly, the portion of the 48 frame buffer 48 storing the frame $100^2$ is selected, as well as another portion of the 48 frame buffer 48.

(2) The host processor 90 issues a direct memory access command to generate a synthetic stream encoding frame $100^2$ by the video encoder 70, and provides the synthetic stream encoding frame $100^2$ to the video decoder 45. The video decoder 45 decodes the synthetic stream, resulting in a decoded synthetic stream comprising reduced frame $100^2$. The decode synthetic stream comprising reduced frame $100^2$ overwrites the frame $100^2$ in the 48 frame buffer 48. Additionally, the video decoder 45 generates reduced frame $100^3$ from frame $100^2$ that is reduced ½ in the horizontal direction, and reduced ⅛ in the horizontal direction from frame 100.

(3) Once the video decoder 45 completes the foregoing, the video decoder 45 transmits a marker interrupt to the host processor 90. Upon receiving the marker interrupt, the host processor 90 clears an icon-enable flag in the predefined data structure.

The display engine 50 is configured to scan out both the frame 100 and the reduced frame $100^m$. Additionally, the display engine 50 can reduce the size of the reduced frame $100^m$ in the vertical direction by a factor of n, by selectively scanning out every nth line 100(nI) of the reduced frame $100^m$.

Figure 3:
FIG. 3 is a block diagram describing the memory management of the decoder in accordance with an embodiment of the present invention.

Referring now to FIG. 3, there is illustrated a block diagram describing a frame buffer 48. During the regular mode of operation, the video decoder 45 writes the frame 100 in a particular one of the frame buffers 48. During the scaling mode of operation, the video decoder 45 during pass 0 writes the reduced frame $100^1$.

In a portion 48(0) of the frame buffer 48 comprising half of the 48 frame buffer 48. During pass 1, the reduced frame $100^1$ is retrieved from the 48 frame buffer 48, encoded by the video encoder 70, thereby generating a synthetic stream that is provided to the video decoder 45. The video decoder 45 decodes the synthetic stream, resulting in a decoded synthetic frame comprising reduced frame 100$^1$. The decoded synthetic stream comprising reduced frame 100$^1$ overwrites the reduced frame 100$^1$. The video decoder 45 also generates a reduced decoded synthetic stream comprising reduced frame 100$^2$. The video decoder 45 writes the reduced frame 100$^2$ into another portion of the 48 frame buffer 48(1) comprising one-fourth of the 48 frame buffer 48. During the pass2, the video encoder 70 encodes the reduced frame 100$^2$, resulting in a synthetic stream comprising reduced frame 100$^2$. The synthetic stream is provided to the video decoder 45. The video decoder 45 overwrites reduced frame 100$^2$ with the decoded synthetic stream, and writes reduced frame 100$^3$ in another portion of the 48 frame buffer 48(2). The portion of the 48 frame buffer 48(2) comprises one-eighth of the icon frame buffer 48.

The foregoing can be repeated iteratively, any number m times, wherein the reduced frame 100$^m$ is written to a portion 48(m−1) comprising ½$^m$ of the 48 frame buffer 48.

Figure 4:
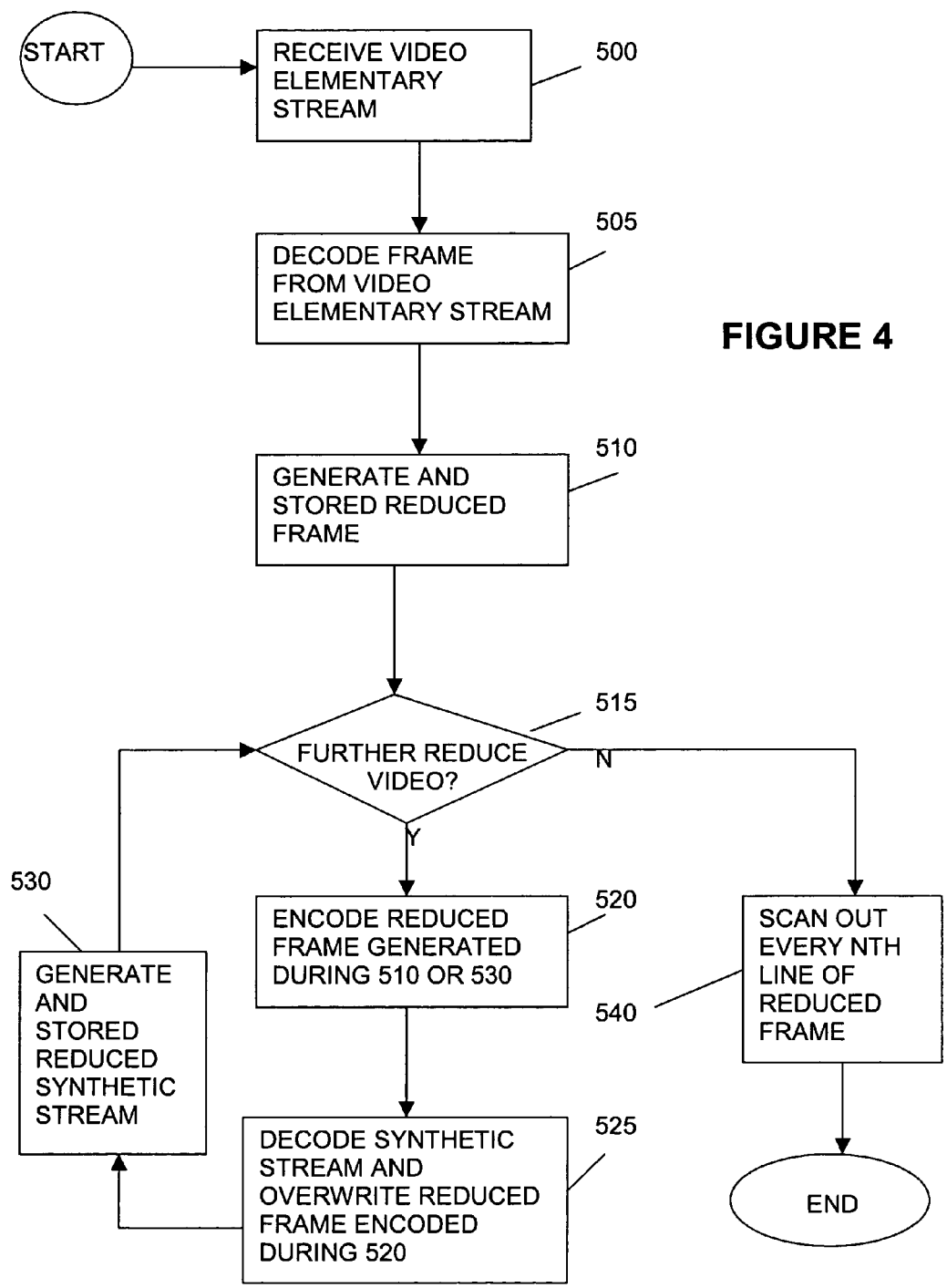
FIG. 4 is a flow diagram for simultaneously providing massively scaled down video according to an embodiment of the present invention.

Referring now to FIG. 4, there is illustrated a flow diagram for simultaneously providing full size video and massively scaled down video according to an embodiment of the present invention. At 500, a video elementary stream is received. At 505, a frame of the video elementary stream is decoded. At 510, a reduced frame is generated from the frame, and stored. At 515, a determination is made whether to further reduce the video. If at 515, the determination is made to further reduce the video, at 520 the reduced frame generated either during 510 or during 530 is encoded as a synthetic picture. At 525, the synthetic stream is decoded. At 530, a reduced synthetic picture is generated, reduced, and stored. After 530 a determination is made at 515 whether to further reduce or not. If a determination is made to further reduce, 520-530 are repeated.

If the determination is made not to further reduce the frame, at 540, the display engine 50 sans out every nth line of the reduced frame.

The inventions described herein may be implemented as a board level product, as a single chip, application specific integrated circuit (ASIC), or with varying levels of the system integrated on a single chip with other portions of the system as separate components. The degree of integration of the monitoring system may primarily be determined by speed and cost considerations. Because of the sophisticated nature of modern processors, it is possible to utilize a commercially available processor, which may be implemented external to an ASIC implementation of the present system. Alternatively, if the processor is available as an ASIC core or logic block, then the commercially available processor can be implemented as part of an ASIC device wherein the memory storing instructions is implemented as firmware.

While the invention has been described with reference to certain embodiments, it will be understood by those skilled in the art that various changes may be made and equivalents may be substituted without departing from the scope of the invention. In addition, many modifications may be made to adapt a particular situation or material to the teachings of the invention without departing from its scope. Therefore, it is intended that the invention not be limited to the particular embodiment disclosed, but that the invention will include all embodiments falling within the scope of the appended claims.

The invention claimed is:

1. A decoder system for providing a video output, said decoder system comprising:
   a video decoder for decompressing the input video stream, and for outputting a decompressed video stream, said decompressed video stream having a displayable size, and another decompressed video stream, wherein the another decompressed video stream has a reduced displayable size when decompressed;
   memory for storing the another decompressed video stream; and
   a synthetic picture generator for encoding the another decompressed video stream, thereby resulting in a synthetic video stream.

2. The decoder system of claim 1, wherein the video decoder decompresses the synthetic video stream, thereby resulting in a decoded synthetic video stream.

3. The decoder system of claim 2, wherein the video decoder reduces the synthetic video stream, thereby resulting in a reduced synthetic video stream and wherein the memory stores the reduced synthetic video stream.

4. The decoder system of claim 1, wherein generating a reduced video stream further comprises averaging horizontally adjacent pixels in the decoded picture.

5. The decoder system of claim 1, wherein encoding the reduced video stream further comprises:
   predicting the synthetic video stream from the reduced video stream.

6. The decoder system of claim 5, wherein the reduced video stream comprises a prediction error equal to zero.

7. A system for providing a video output, said system comprising:
   an input for receiving an input video stream;
   a video decoder for decompressing the input video stream, and for outputting a decompressed video stream, said decompressed video stream having a displayable size, and another decompressed video stream, wherein the another decompressed video stream has a reduced displayable size when decompressed;
   a display engine for scanning the decompressed video stream; and
   an encoder for encoding the another decompressed video input stream, thereby resulting in a third video stream, and providing the third video stream to the input.

8. The system of claim 7, further comprising:
   a first frame buffer for storing the decoded input video stream.

9. The system of claim 8, further comprising:
   a second frame buffer for storing the reduced decoded input video stream.

10. The system of claim 9, wherein the decoder decodes the synthetic video stream, and outputs a decoded synthetic video stream and a reduced decoded synthetic video stream.

11. The system of claim 10, wherein the second frame buffer overwrites the reduced decoded input video stream with the synthetic video stream and stores the reduced decoded synthetic video stream.

12. The system of claim 11, wherein the display engine scans out the reduced decoded synthetic video stream.

13. The system of claim 7, wherein the display engine periodically discards lines of the reduced decoded input stream.

14. The system of claim 7, wherein the input video stream comprises a video elementary stream.

15. The system of claim 7, wherein the third video stream comprises a plurality of pictures, and wherein each of the pictures are intracoded pictures.

16. A method for providing a video output, said method comprising:
   receiving an input video stream;
   decompressing the input video stream;

outputting a decompressed video stream, said decompressed video stream having a displayable size and another decompressed input video stream, wherein the another decompressed video stream has a reduced displayable size when decompressed;

scanning the decompressed video stream;

encoding the another decompressed video stream, thereby resulting in a third video stream; and providing the third video stream to the input.

17. The method of claim 16, wherein the input video stream comprises a video elementary stream.

18. The method of claim 16, further comprising:

storing the decoded input video stream.

19. The method of claim 18, further comprising:

storing the reduced decoded input video stream.

20. The method of claim 16, further comprising:

periodically discards lines of the reduced decoded input stream.

* * * * *